A. J. BAUMLER.
WHEEL MOUNTING.
APPLICATION FILED JAN. 17, 1919.
1,367,006.
Patented Feb. 1, 1921.
2 SHEETS—SHEET 1.
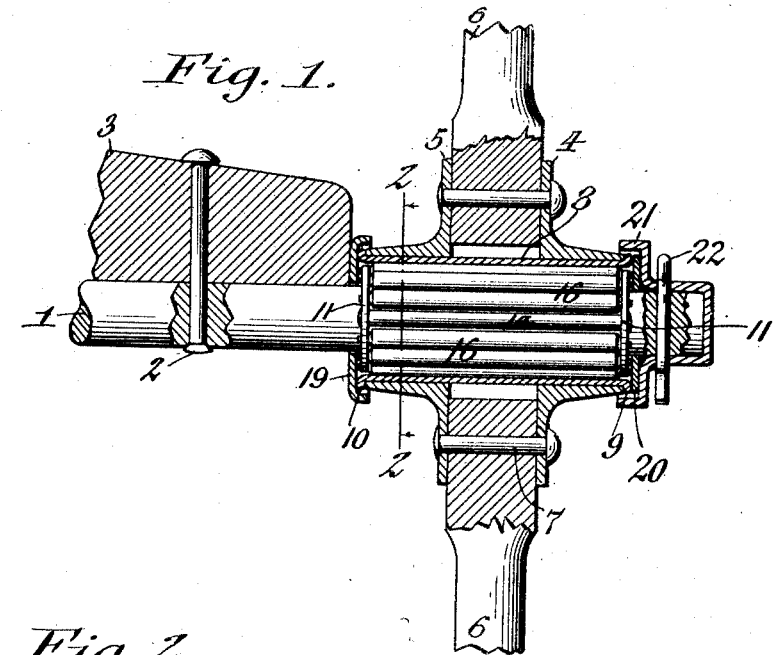
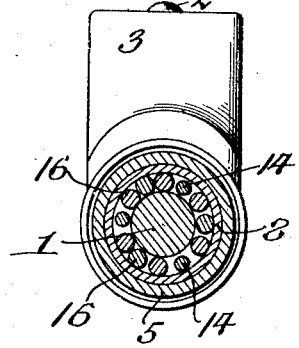
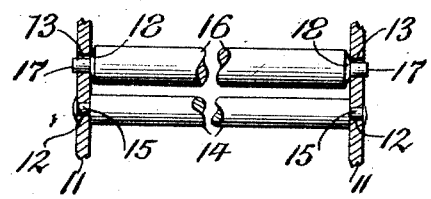
Inventor,
Albert J. Baumler
by Geyer & Popp
Attorneys.

A. J. BAUMLER.
WHEEL MOUNTING.
APPLICATION FILED JAN. 17, 1919.

1,367,006.

Patented Feb. 1, 1921.
2 SHEETS—SHEET 2.

Inventor:-
Albert J. Baumler
by Geyer & Popp
Attorneys.

UNITED STATES PATENT OFFICE.

ALBERT J. BAUMLER, OF KENMORE, NEW YORK, ASSIGNOR TO THE BUFFALO SLED COMPANY, OF BUFFALO, NEW YORK, A CORPORATION OF NEW YORK.

WHEEL-MOUNTING.

1,367,006.    Specification of Letters Patent.    Patented Feb. 1, 1921.

Application filed January 17, 1919. Serial No. 271,679.

*To all whom it may concern:*

Be it known that I, ALBERT J. BAUMLER, a citizen of the United States, residing in Kenmore, in the county of Erie and State of New York, have invented new and useful Improvements in Wheel-Mountings, of which the following is a specification.

This invention relates to a wheel mounting which is more particularly designed for journaling the wheels of toy or juvenile wagons on the axles of the wagon body although this invention is also applicable for other uses.

One of the objects of this invention is to produce a wheel mounting for the purpose in which bearing rollers are employed for reducing the friction between the wheel and the axle and to so mount these rollers that the same can be applied to as well as removed from the wheel and axle while in an assembled condition and without liability of displacing the same relatively to each other. A further object of this invention is to so construct this wheel mounting that the same can be produced at comparatively low cost and permit of assembling of the same with other parts of the wagon as well as dismembering the same easily and conveniently.

Figure 4:
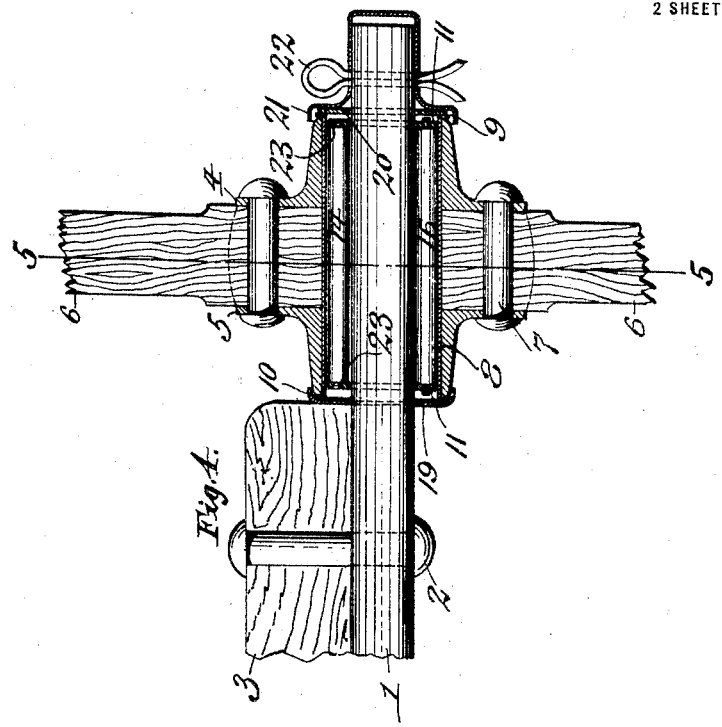
Figure 5:
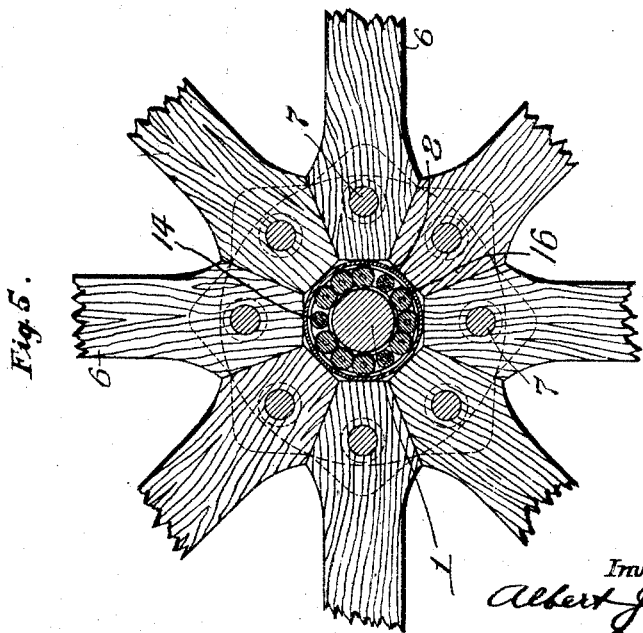

In the accompanying drawings:

Figure 1 is a fragmentary vertical longitudinal section showing one form of my invention for mounting a wheel on an axle. Fig. 2 is a vertical cross section taken on line 2—2, Fig. 1. Fig. 3 is a fragmentary longitudinal section, on an enlarged scale, of one of the bearing rollers and one of the stay rods showing the manner of mounting the same on the end rings of the retaining cage. Fig. 4 is a vertical longitudinal section showing a wheel mounted on an axle by a modified form of my improved roller bearing. Fig. 5 is a vertical transverse section taken on line 5—5, Fig. 4.

Similar characters of reference refer to like parts throughout the several views.

1 represents the stationary axle of a wagon which may be connected with the body thereof in any suitable manner, this axle in the present instance being connected by means of a rivet 2 with a bolster 3 mounted on the upper side of the axle.

The wheel which is mounted on the end of this axle may also be of any suitable construction but as shown in the drawings the same comprises two hub collars 4, 5, surrounding the axle, a plurality of radial spokes 6 secured between the inner parts of these collars by means of rivets 7 and a hub sleeve 8 extending through these collars and provided at its front and rear ends with outwardly turned flanges 9, 10 which engage with the front and rear ends of these collars and confine the hub sleeve therein. The bore of the hub sleeve is separated by an annular space from the periphery of the axle and in this space is arranged the roller bearing whereby a rolling support for the wheel is provided on the axle. In its preferred form this rolling bearing comprises two retaining rings 11, 11 which are arranged transversely and surround the axle adjacent to opposite ends of the hub sleeve and each of which is provided with a plurality of seat openings 12 and a plurality of bearing openings 13 which are arranged parallel with the axis of the ring. As shown in the drawings three seat openings are formed in each ring and three bearing openings are formed between adjacent seat openings, but this number may be varied if desired. A plurality of stay rods are arranged lengthwise of the axle and bearing sleeve, each rod having an enlarged central or body part 14 and reduced necks 15 at its opposite ends which latter are secured in a corresponding pair of seat openings in the two retaining rings by riveting or upsetting the outer ends of these necks, as shown in the drawings, or in any other suitable manner, so that the retaining rings and the stay rods together form a cage or retaining frame for the roller bearing. The diameter of the body of these stay rods is less than the distance between the periphery of the axle and the bore of the hub sleeve and these stay rods and the retaining rings are so mounted that the inner side of these rods and rings are cut out of engagement from the periphery of the axle and the outer sides of the same are out of engagement from the bore of the hub sleeve and thereby avoid frictional contact therewith so as not to interfere with the free action of the roller bearing.

Between the stay rods and retaining rings are arranged a plurality of longitudinal bearing rollers, each of which is provided with an enlarged cylindrical central part 16, reduced end portions 17 forming trunnions at opposite ends of the body and outwardly tapering shoulders 18 between the enlarged central part and the trunnions, as best shown in Fig. 2. The enlarged body of each of these rollers engages its inner side with the periphery of the axle and its outer side with the bore of the hub sleeve while its trunnions engage with a corresponding pair of the bearing openings in the retaining rings and its tapering shoulders engage with the inner sides of these rings. By this means the rollers are free to turn in the retaining rings and also to roll between the axle and hub sleeve but are held in a position parallel with the axis of the wheel and axle so as to avoid cramping of the parts and insure free turning of the wheel about the axle with a minimum of friction. By reason of the tapering shoulders at opposite ends of the bearing rollers the end thrust of these rollers against the retaining rings is minimized, thereby further reducing resistance to the turning movement of these rollers and adding to the easy running of the wheel.

This roller bearing may be confined within the hub sleeve in any suitable manner, for instance, as shown in Fig. 1 this is accomplished by means of a rear retaining cap 19 mounted on the axle between the rear end of the hub sleeve and the bolster and having its rim projecting forwardly around the rear end of the rear hub collar, a washer 20 mounted on the front end of the axle and engaging with the front end of the hub sleeve, and a front hub cap 21 secured by means of a cotter pin 22 to the front end of the axle in front of this washer and having its marginal rim projecting rearwardly around the adjacent part of the front hub collar.

Instead of providing the bearing rollers with tapering shoulders between the enlarged cylindrical bodies and the reduced end trunnions thereof, as shown in Fig. 3, these shoulders may be arranged radially or perpendicular to the axis of these rollers, as shown at 23 in Fig. 4. In other respects the parts shown in Figs. 4 and 5 may be constructed substantially like those shown in Figs. 1-3.

This wheel mounting is not only very simple and inexpensive in construction, but the same also enables the wheel to turn very easily without lubrication, thereby rendering the same particularly suitable for juvenile wagons which are not likely to receive much care or attention after the same go into use.

I claim as my invention:

A wheel mounting comprising a hub sleeve, a washer adapted to be mounted on the axle and to engage the outer end of said sleeve, caps adapted to be mounted on the axle and embracing the ends of said hub sleeve, a cage having transverse rings adapted to surround the axle within the hub sleeve and each provided with seat openings and bearing openings, a plurality of longitudinal stay rods each of which is secured at its opposite ends in a pair of corresponding seat openings of said rings and having a diameter less than the distance between said axle and bearing sleeve, a plurality of longitudinal bearing rollers each journaled at its opposite ends in a corresponding pair of bearing openings in said rings and engaging its inner side with the periphery of said axle and its outer side with the bore of said bearing sleeve, hub collars mounted in spaced relation on said hub sleeve, the ends of the latter being provided with flanges which engage with the outer ends of said collars, and spokes secured between said collars.

ALBERT J. BAUMLER.